United States Patent
Lee et al.

(10) Patent No.: US 12,491,630 B2
(45) Date of Patent: Dec. 9, 2025

(54) INTEGRATED SELF-MONITORING SOFT ACTUATOR AND SELF-MONITORING METHOD OF SOFT ACTUATOR

(71) Applicant: Daegu Gyeongbuk Institute of Science and Technology, Daegu (KR)

(72) Inventors: Jae Hong Lee, Daegu (KR); Hwa Joong Kim, Daegu (KR)

(73) Assignee: Daegu Gyeongbuk Institute of Science and Technology, Daegu (KR)

( * ) Notice: Subject to any disclaimer, the term of this patent is extended or adjusted under 35 U.S.C. 154(b) by 266 days.

(21) Appl. No.: 18/032,425

(22) PCT Filed: Dec. 13, 2021

(86) PCT No.: PCT/KR2021/018849
§ 371 (c)(1),
(2) Date: Apr. 18, 2023

(87) PCT Pub. No.: WO2022/131715
PCT Pub. Date: Jun. 23, 2022

(65) Prior Publication Data
US 2023/0381960 A1 Nov. 30, 2023

(30) Foreign Application Priority Data
Dec. 14, 2020 (KR) .......... 10-2020-0174747

(51) Int. Cl.
*B25J 9/16* (2006.01)
*B25J 19/02* (2006.01)

(52) U.S. Cl.
CPC ............. *B25J 9/1635* (2013.01); *B25J 19/02* (2013.01)

(58) Field of Classification Search
CPC .......... G05B 2219/40253; B25J 9/1635; B25J 19/02; B25J 9/101; B25J 9/1674; B25J 9/12; B25J 9/14; B25J 9/0006
See application file for complete search history.

(56) References Cited

U.S. PATENT DOCUMENTS 10,576,643 B2 * 3/2020 Lessing .................. B25J 13/088
2013/0085493 A1 * 4/2013 Bloom ............... A61B 18/1492
606/41

(Continued)

FOREIGN PATENT DOCUMENTS

JP 2017-528661 A 9/2017
KR 10-2016-0117658 A 10/2016

(Continued)

OTHER PUBLICATIONS

Korean Notice of Allowance for KR 10-2020-0174747 dated Mar. 21, 2023.

(Continued)

*Primary Examiner* — Adam R Mott
*Assistant Examiner* — Sagar Kc
(74) *Attorney, Agent, or Firm* — Sughrue Mion, PLLC

(57) ABSTRACT

Disclosed is an integral self-monitoring soft actuator including a body portion configured to be driven by deformation due to stimulation; a first limiter integrally formed with respect to the longitudinal direction of the body portion to limit deformation of the body portion in the longitudinal direction; a second limiter that limits deformation of the body portion in the radial direction by including at least a pair of electrodes in a spiral shape integrally provided on the outer surface of the body portion; and a controller for controlling motion of the body portion, wherein the controller self-monitors deformation of the body portion by self-sensing changes in the intervals between the electrodes according to deformation of the body portion. According to (Continued)

the above configuration, deformation of the body portion may be self-detected in real time using the second limiter integrally provided with the body portion, thereby improving control efficiency.

16 Claims, 6 Drawing Sheets

(56) References Cited

U.S. PATENT DOCUMENTS

| | | | | |
|---|---|---|---|---|
| 2015/0070904 A1* | 3/2015 | Martinez | ............... | F15B 15/103 |
| | | | | 92/261 |
| 2015/0090113 A1* | 4/2015 | Galloway | ................ | B25J 9/142 |
| | | | | 92/48 |
| 2015/0369264 A1* | 12/2015 | Felt | .......................... | G01D 5/14 |
| | | | | 92/90 |
| 2016/0052131 A1* | 2/2016 | Lessing | .................... | B25J 15/12 |
| | | | | 361/679.01 |
| 2016/0256228 A1* | 9/2016 | Haartsen | ................. | A61B 34/30 |
| 2023/0057185 A1* | 2/2023 | Hunt | .................... | A61B 5/6832 |

FOREIGN PATENT DOCUMENTS

| | | |
|---|---|---|
| KR | 10-1871384 B1 | 6/2018 |
| KR | 10-2018-0082228 A | 7/2018 |
| KR | 10-2140691 B1 | 8/2020 |

OTHER PUBLICATIONS

International Search Report for PCT/KR2021/018849 dated Mar. 11, 2022.

\* cited by examiner

[FIG. 1]
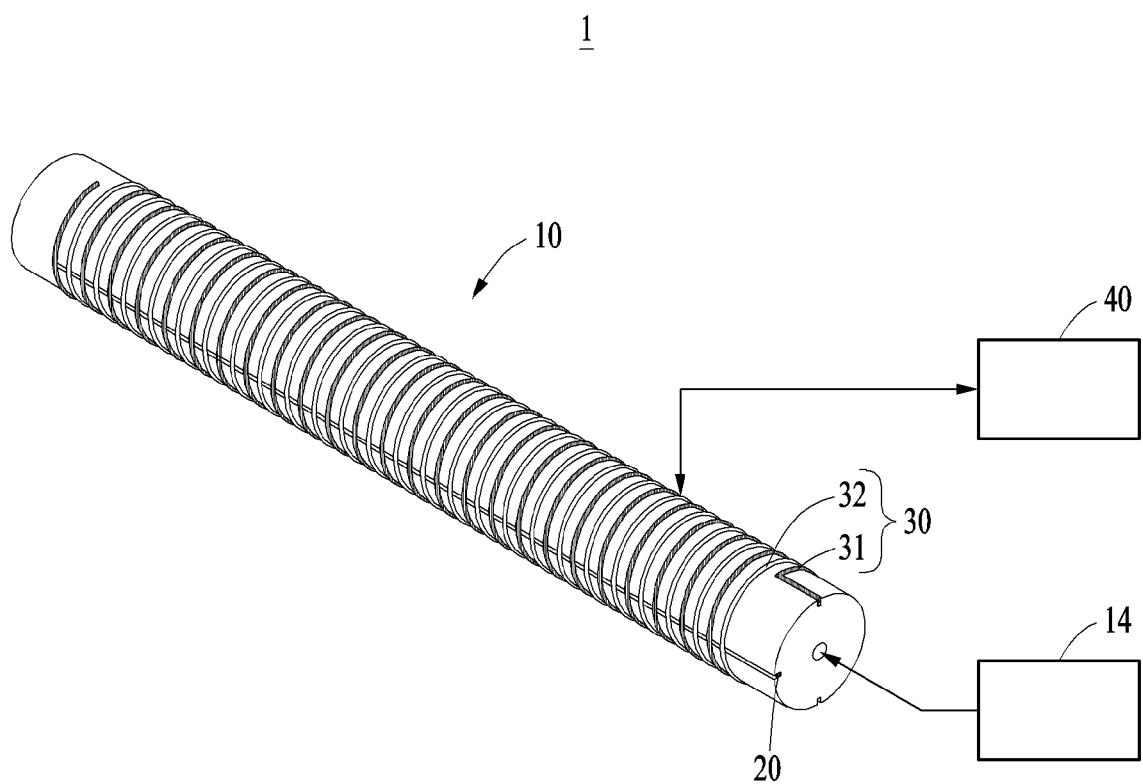

[FIG. 2]
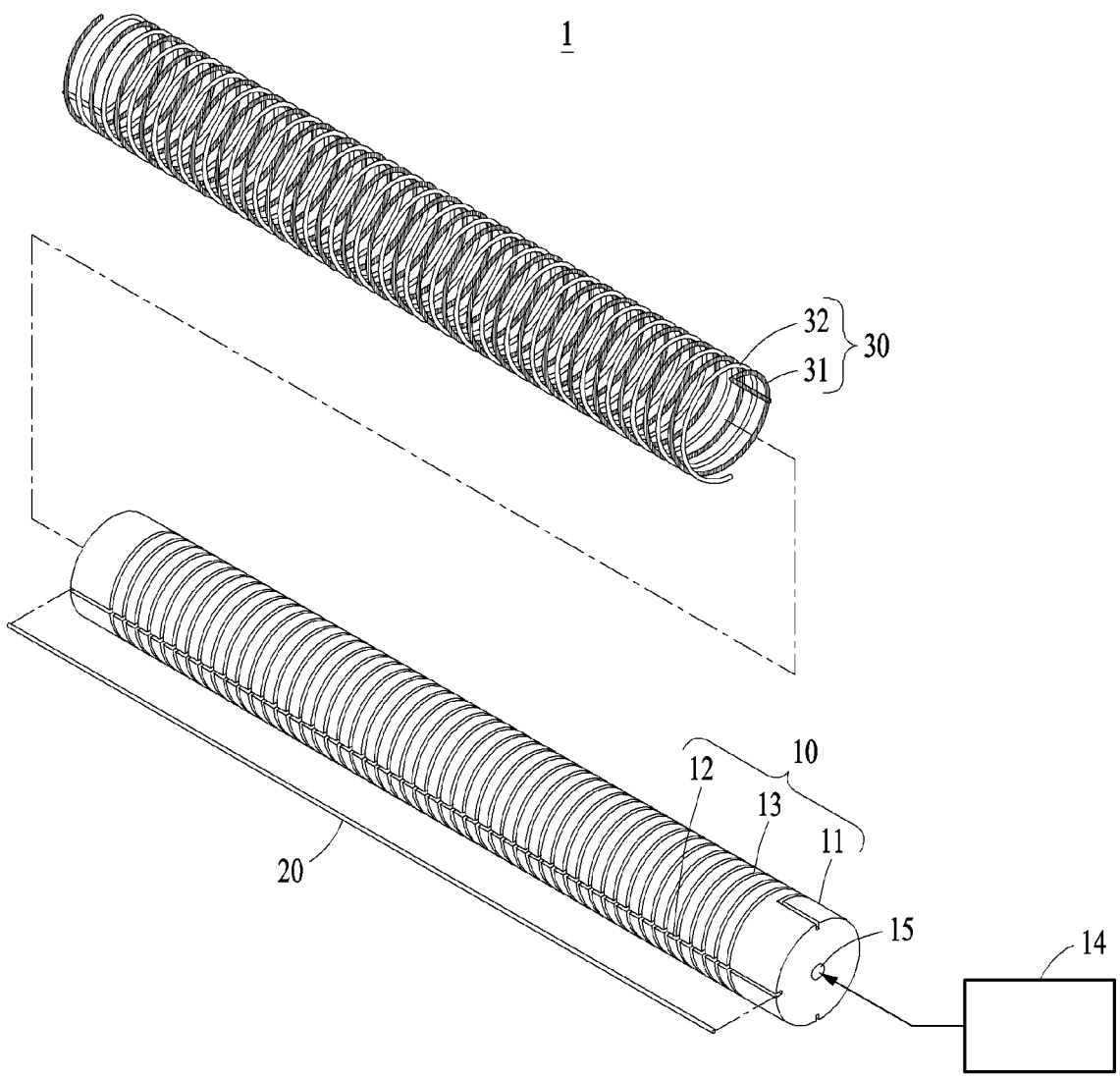

[FIG. 3]
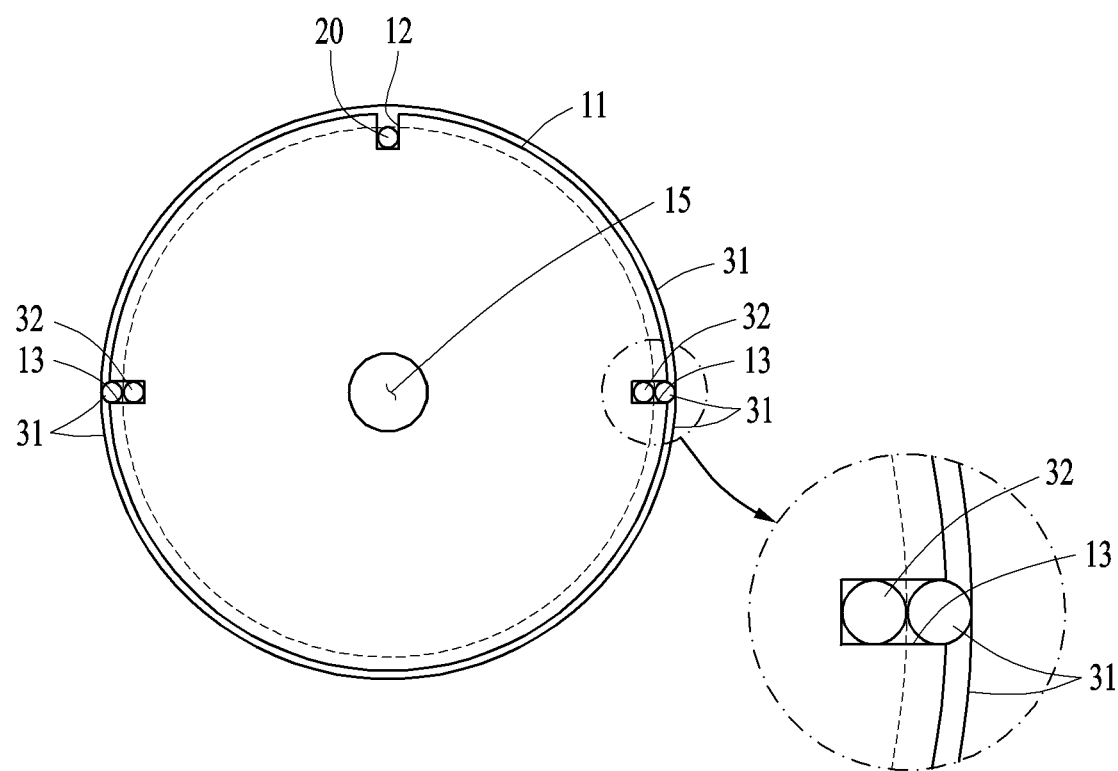

[FIG. 4]
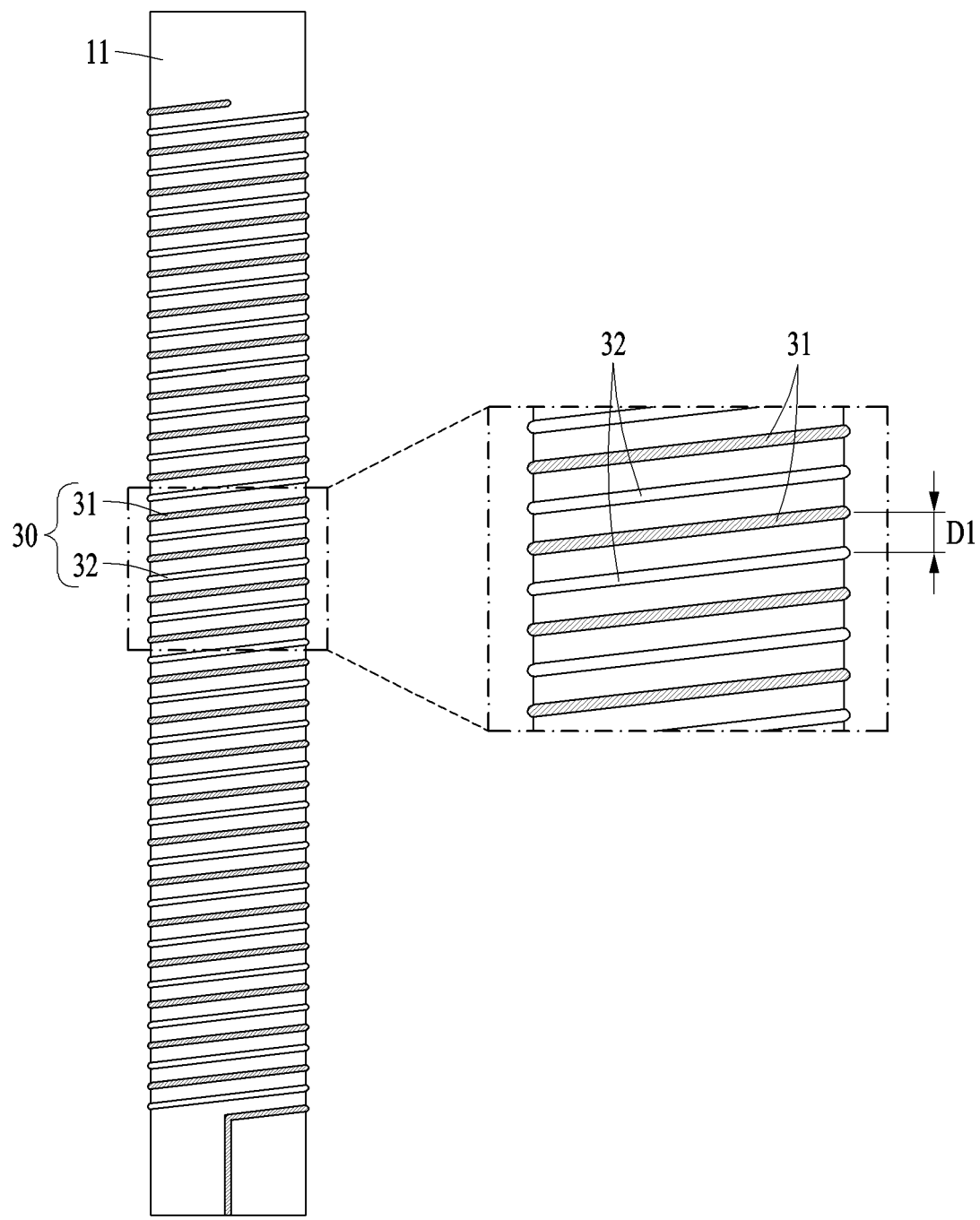

[FIG. 5]
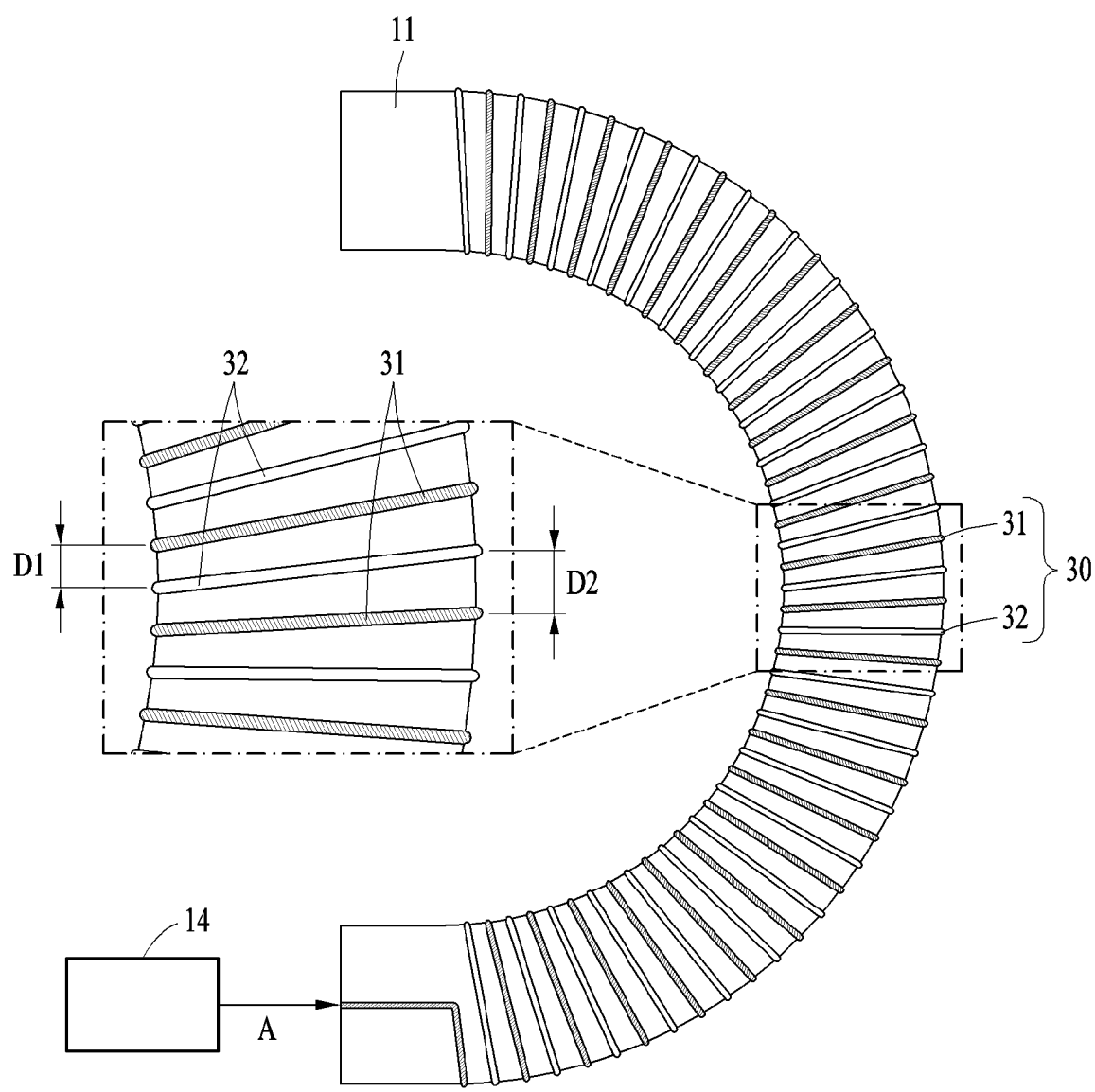

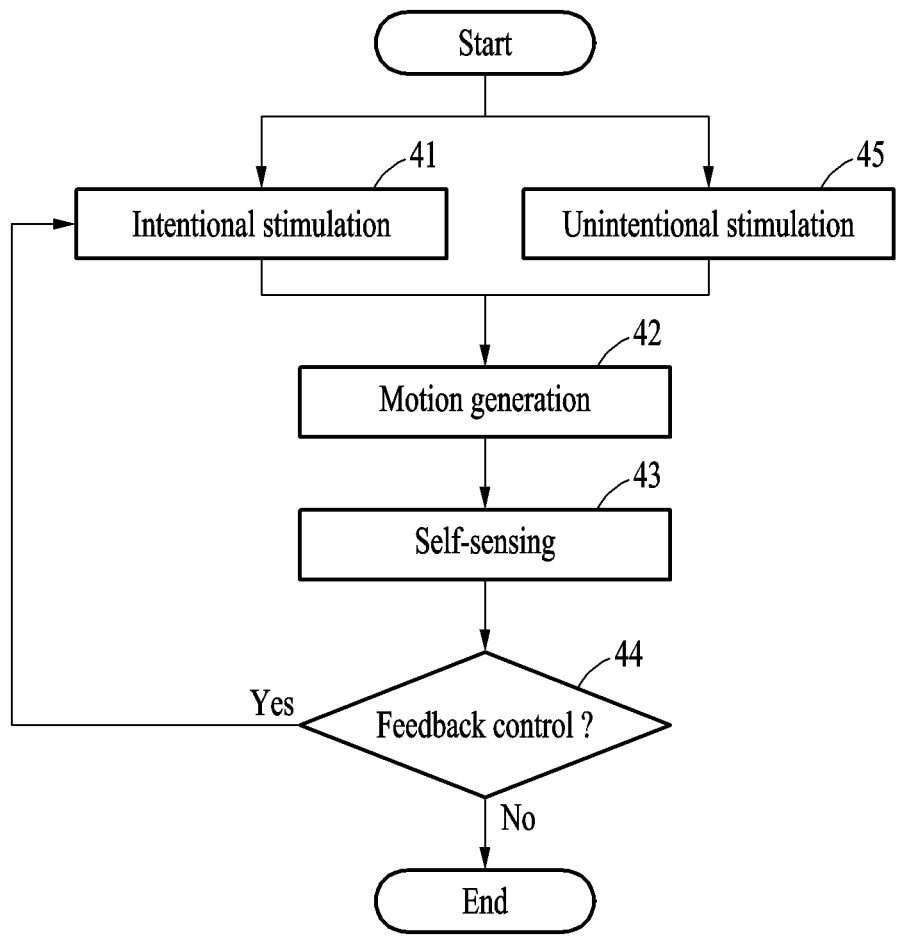
[FIG. 6]

INTEGRATED SELF-MONITORING SOFT ACTUATOR AND SELF-MONITORING METHOD OF SOFT ACTUATOR

CROSS-REFERENCE TO RELATED APPLICATION

This application is a National Stage Entry of PCT International Application No. PCT/KR2021/018849, which was filed on Dec. 13, 2021, and claims priority to Korean Patent Application No. 10-2020-0174747, filed on Dec. 14, 2020, in the Korean Intellectual Property Office, the disclosure of which is incorporated herein by reference.

TECHNICAL FIELD

The present invention relates to an integral self-monitoring soft actuator and a method of self-monitoring of a soft actuator. More particularly, the present invention relates to an integral self-monitoring soft actuator capable of improving control efficiency through self-sensing ability to distinguish between intentional deformation by a driving source and unintentional deformation by external force in real time and a method of self-monitoring of a soft actuator.

BACKGROUND ART

In the case of soft actuators applied to general wearable devices, robots, or artificial muscles, deformation of the actuators can be quantitatively controlled by adjusting the hydraulic pressure or voltage thereof. When these soft actuators are applied to various practical applications such as flexible robots and grippers, the soft actuators inevitably contact or interact with other objects.

In addition, soft actuators are easily exposed to various external stimuli such as wind, temperature, and physical external force depending on surrounding environments. In particular, when soft actuators are used in wearable devices including wearable robots and auxiliary devices, various external stimuli such as user motions are applied to the soft actuators, and unintentional deformation can easily occur in the soft actuators.

On the other hand, in the case of conventional soft actuators, deformation of the soft actuators can be intentionally controlled by intentional stimulation through adjustment of hydraulic pressure or voltage, but there is a limit in that unintentional deformation or movement by external stimulation cannot be directly monitored. Therefore, in recent years, studies have been continuously conducted to prevent driving failures due to unintended deformation by monitoring motions caused by various deformations of a soft actuator.

DISCLOSURE

Technical Problem

Therefore, the present invention has been made in view of the above problems, and it is one object of the present invention to provide an advanced integral self-monitoring soft actuator capable of feedback control of driving by self-detecting deformation caused by stimulation in real time.

It is another object of the present invention to provide a method of self-monitoring of a soft actuator capable of self-monitoring in real time to distinguish between intentional stimulation by a driving source and unintentional stimulation by external force.

Technical Solution

In accordance with one aspect of the present invention, provided is an integral self-monitoring soft actuator including a body portion configured to be driven by deformation due to stimulation, a first limiter integrally formed with respect to a longitudinal direction of the body portion to limit deformation of the body portion in the longitudinal direction, a second limiter that limits deformation of the body portion in a radial direction by including at least a pair of electrodes in a spiral shape integrally provided on an outer surface of the body portion; and a controller for controlling motion of the body portion, wherein the controller self-monitors deformation of the body portion by self-sensing changes in intervals between the electrodes according to deformation of the body portion.

In addition, the body portion may be made of an elastic material, the first limiter may be made of a fiber material that physically limits deformation of the body portion, and the second limiter may be made of a conductive fiber material.

In addition, the body portion may include a hollow body made of an elastic material, and first and second insertion grooves into which the first and second limiters are inserted and seated may be formed on an outer surface of the body.

In addition, the first limiter may be provided in a form of one degree of freedom in a longitudinal direction on one side of the body portion. When external stimulation is applied to the body portion, deformation may occur on the other side where the first limiter is not provided.

In addition, the first and second limiters may be attached to an outer surface of the body portion.

In addition, the second limiter may include a first electrode provided in a spiral direction along an outer surface of the body portion and a second electrode provided in a spiral direction along the outer surface of the body portion. In this case, the first and second electrodes may be alternately disposed adjacent to each other and may be made of conductive fiber.

In addition, the first and second electrodes may be inserted into insertion grooves provided on an outer surface of the body portion and may be protected by being coated with an elastic material.

In addition, the controller may detect a change in capacitance in real time according to changes in intervals between the first and second electrodes, and may perform feedback control by distinguishing motion by intentional stimulation or unintentional stimulation applied to the body portion.

In addition, intervals between the first and second electrodes wound along an outer surface of the body portion and an spiral angle of the first and second electrodes are adjustable.

In addition, the controller may quantify a capacitance change according to changes in intervals between the first and second electrodes by the intentional stimulation as an expected result value, and may distinguish the intentional stimulation and the unintentional stimulation by comparing a value obtained by subtracting the expected result value from an actual result value corresponding to real-time interval changes between the first and second electrodes with 0.

In addition, when pressure applied to the body portion is 0, when deformation of x % or more lasts for y seconds, the controller may increase the intentional stimulation applied to the body portion.

In accordance with another aspect of the present invention, provided is a method of self-monitoring of a soft actuator, the method including a stimulation step of applying stimulation to a body portion; a motion generation step in which the body portion is deformed by the stimulation; a self-sensing step of self-sensing deformation of the body portion; and a feedback control step of performing feedback control on the body portion, wherein, in the self-sensing step, changes in intervals between at least a pair of electrodes provided in a double helix structure on the body portion are detected.

In addition, in the stimulation step, at least one stimulation of intentional stimulation by driving sources including air pressure, a voltage, pressure of a liquid flowing into the body portion or vaporization pressure of the liquid, expansion due to increase in temperature inside the body portion, stimulation response by light, and chemical reaction and unintentional stimulation by external force may be applied to the body portion.

In addition, in the feedback control step, intentional and unintentional stimulation applied to the body portion may be separately detected. When motion generation of the body portion due to the unintentional stimulation is detected, control may be performed to apply the intentional stimulation to the body portion.

In addition, the body portion may be made of an elastic material, deformation of the body portion in a longitudinal direction may be limited by a first limiter provided in a form of one degree of freedom in a longitudinal direction on the body portion, and deformation of the body portion in a radial direction may be limited by the electrodes.

In addition, the first limiter may be made of a fiber material that physically limits deformation of the body portion and may be attached to an outer surface of the body portion.

In addition, the electrodes may be made of conductive fiber and may be attached to an outer surface of the body portion. In the self-sensing step, a change in capacitance according to changes in intervals between the electrodes may be detected in real time.

In addition, in the feedback control step, a capacitance change according to changes in intervals between the electrodes by intentional stimulation applied to the body portion may be quantified as an expected result value, and the intentional stimulation and the unintentional stimulation may be distinguished by comparing a value obtained by subtracting the expected result value from an actual result value corresponding to real-time interval changes between the electrodes with 0.

In addition, in the feedback control step, when pressure applied to the body portion is 0, when deformation of x % or more lasts for y seconds, intentional stimulation applied to the body portion may be increased.

In addition, intervals between the electrodes wound along an outer surface of the body portion and an spiral angle of the electrodes are adjustable.

Advantageous Effects

According to the present invention having the configuration as described above, first, in self-sensing the deformation motion of a soft actuator in real time, in addition to intentional deformation, deformation due to application of unintentional stimulation can also be self-detected in real time. Accordingly, driving failure can be prevented in advance by self-sensing intentional stimulation and unintentional stimulation in real time, thereby improving control efficiency.

Second, since limiters capable of limiting the motion of a soft actuator are attached to a body portion and formed integrally, various types of motion can be implemented depending on methods of attaching the limiters, which is advantageous in securing diversity of use.

Third, since limiters that limit the motion of a soft actuator can simultaneously perform self-sensing function, a soft actuator having a simple structure can be provided without additional sensor parts.

Fourth, by including limiters provided in the form of one degree of freedom, a form with a high degree of freedom can be advantageously induced.

Fifth, when used in wearable rehabilitation aids, intentional and unintentional movements can be sensitively detected, enabling advanced wearable devices to be implemented.

DESCRIPTION OF DRAWINGS

FIG. 1 is a perspective view schematically showing an integral self-monitoring soft actuator according to a preferred embodiment of the present invention.

FIG. 2 is an exploded perspective view of the integral self-monitoring soft actuator shown in FIG. 1.

FIG. 3 is a front view of the integral self-monitoring soft actuator shown in FIG. 1.

FIG. 4 is a flowchart for explaining a method of self-monitoring of the soft actuator shown in FIG. 1.

FIG. 5 is a top view of the integral self-monitoring soft actuator shown in FIG. 1.

FIG. 6 is a top view schematically showing a deformed state of the integral self-monitoring soft actuator shown in FIG. 5.

BEST MODE

Hereinafter, preferred embodiments of the present invention will be described with reference to the accompanying drawings. However, the spirit of the present invention is not limited to the embodiments, and the spirit of the present invention may be proposed differently by adding, changing, and deleting the elements constituting the embodiments, which is also within the spirit of the present invention.

FIGS. 1 and 2 are a perspective view and an exploded perspective view schematically showing an integral self-monitoring soft actuator 1 according to a preferred embodiment of the present invention, respectively, and FIG. 3 is a front view of the integral self-monitoring soft actuator 1 shown in FIG. 1.

Referring to FIGS. 1 and 2, the integral self-monitoring soft actuator 1 according to a preferred embodiment of the present invention includes a body portion 10, a first limiter 20, and a second limiter 30.

For reference, the integral self-monitoring soft actuator 1 described in the present invention is exemplified as a soft actuator applied to a wearable auxiliary glove for stroke patients. However, the present invention is not limited thereto, and the integral self-monitoring soft actuator 1 described in the present invention may be applied to various wearable devices.

When stimulation is applied to the inside of the body portion 10, the shape of the body portion 10 is deformed to generate motion, which generates a driving force. As shown in FIG. 2, the body portion 10 includes a body 11, a first insertion groove 12, and a second insertion groove 13.

For reference, in this embodiment, the body portion 10 is deformed by air pressure applied to the inside of the body portion 10 to generate motion. As a method of generating motion of the body portion 10, the present invention is not limited to applying air pressure, and a deformed motion may be generated by applying a predetermined voltage to the body portion 10. In addition, to generate motion of the body portion 10, various driving sources capable of applying intentional stimulation, such as the pressure of a liquid flowing into the body portion 10 or vaporization pressure generated by vaporization of the liquid, expansion due to temperature increase inside the body portion 10, stimulation by light, and stimulation by chemical reaction, may be applied.

The body 11 has a hollow pipe shape. The body 11 is made of a deformable elastic material, and an air channel 15 connected to an air pump 14 is formed through at least one of both ends of the body 11. Here, the air pump 14 is connected to the body 11 and supplies air (A) to the inside of the body 11 through the air channel 15. The body 11 is elastically deformed by air (A) supplied to the inside of the body 11, thereby generating driving force.

For reference, the air pump 14 is connected to a controller 40 to be described later to adjust the supply amount of air (A). Since supply of air (A) by the air pump 14 is not the subject of the present invention, detailed description thereof will be omitted.

The first and second insertion grooves 12 and 13 are seating grooves into which the first and second limiters 20 and 30 to be described later are inserted, and are formed on the outer circumferential surface of the body 11. More specifically, the first insertion groove 12 is formed in the longitudinal direction on the outer circumferential surface of the body 11 so that the first limiter 20 to be described later is seated on the first insertion groove 12, and the second insertion groove 13 is formed in the spiral direction on the outer circumferential surface of the body 11 so that the second limiter to be described later is seated on the second insertion groove 13.

The shape, number, and width of the first and second insertion grooves 12 and 13 are not limited to the illustrated example and may be variously modified depending on the first and second limiters 20 and 30.

The first limiter 20 is provided on the outer circumferential surface of the body portion 10 in the longitudinal direction of the body portion 10 to limit deformation motion of the body portion 10 in the longitudinal direction. The first limiter 20 may extend in the longitudinal direction along the outer circumferential surface of the cylindrical body 11 of the body portion 10, and at least one first limiter 20 may be provided.

In this embodiment, one first limiter 20 is provided on one side of the body 11 in the longitudinal direction. In this case, deformation of the body portion 10 is limited at one side of the body 11 on which the first limiter 20 is formed. In contrast, the other side of the body 11 on which the first limiter 20 is not formed expands and bends in the opposite direction to the first limiter 20.

For reference, in this embodiment, one first limiter 20 is provided on one side of the body 11 in the longitudinal direction of the body 11, but the present invention is not limited thereto. Various modified embodiments are possible. For example, two or more first limiters 20 may be provided to be spaced apart from each other at a predetermined angle (e.g., approximately 5°) on one side of the body 11 with respect to the circumferential direction of the body 11.

As described above, when the first limiter 20 is provided in the longitudinal direction on the outer circumferential surface of the body 11, the first limiter 20 is provided in the form of one degree of freedom so as to be seated in the first insertion groove 12 of the body 11. In addition, the first limiter 20 is attached to the body 11 so as to be integrally provided with the body portion 10. Since the first limiter 20 is seated on and attached to the body 11 and provided in the form of one degree of freedom, depending on methods of attaching the first limiter 20, deformation with a high degree of freedom in various directions may be advantageously induced.

In addition, the first limiter 20 is made of a fiber material having high strength, thereby physically limiting deformation of the body portion 10. That is, since the first limiter 20 is made of a material having higher strength than the body portion 10, deformation of the body portion 10 on one side on which the first limiter 20 is provided may be physically limited.

The second limiter 30 includes at least a pair of electrodes 31 and 32 wound in the spiral direction along the outer circumferential surface of the body portion 10 to limit deformation of the body portion 10 in the radial direction. In this embodiment, as shown in FIG. 2, the second limiter 30 is exemplified as having a double helix structure including the electrodes 31 and 32. Hereinafter, for convenience of explanation, the electrodes 31 and 32 are referred to as the first and second electrodes 31 and 32, respectively.

The first electrode 31 is provided in the spiral direction along the outer circumferential surface of the body 11 of the body portion 10. In addition, the second electrode 32 is provided in the spiral direction along the outer circumferential surface of the body 11 of the body portion 10. In this case, the first and second electrodes 31 and 32 are alternately disposed adjacent to each other. At this time, the first and second electrodes 31 and 32 are seated in the second insertion groove 13 formed in the spiral direction on the outer circumferential surface of the body 11 to alternately cross each other. As the first and second electrodes 31 and 32 limit deformation of the body 11 of the body portion 10 in the spiral direction, the first and second electrodes 31 and 32 limit radial expansion of the body 11 in the radial direction.

In addition, the first and second electrodes 31 and 32 are formed of conductive fibers capable of electrically exchanging signals. Like the first limiter 20, the first and second electrodes 31 and 32 are attached to the outer circumferential surface of the body 11 to be integrally provided with the body portion 10. That is, the second limiter 30 may also be attached to the body portion 10 in various ways, and may be provided integrally with the body portion 10.

After the first and second electrodes 31 and 32 are seated in the second insertion groove 13 of the body portion 10, the first and second electrodes 31 and 32 may be coated with an elastic material. When the first and second electrodes 31 and 32 are coated with an elastic material while being inserted into the second insertion groove 13, the first and second electrodes 31 and 32 may be protected from external environments, and the first and second electrodes 31 and 32 may be stably attached to the body portion 10.

For reference, in this embodiment, as shown in FIG. 3, the first limiter 20 and the first and second electrodes 31 and 32 of the second limiter 30 have the same diameter, but the present invention is not limited thereto. For example, the diameter of the first limiter 20 may be larger or smaller than the diameter of the second limiter 30, and the first and second electrodes 31 and 32 of the second limiter 30 may have different diameters.

To suppress deformation of the body portion 10 in the radial direction, the intervals and spiral angle between the first and second electrodes 31 and 32 may be adjusted. For example, when the supply amount of air (A) flowing into the body portion 10 is large, that is, when air pressure applied to the body portion 10 is high, to limit radial expansion of the body portion 10 with strong force, the intervals between the first and second electrodes 31 and 32 may be decreased compared to FIGS. 1 to 3. In contrast, when air pressure applied to the body portion 10 is low, the intervals between the first and second electrodes 31 and 32 may be increased compared to FIGS. 1 to 3. The intervals and spiral angle between the first and second electrodes 31 and 32 are not limited to the illustrated example and may be variously changed depending on use conditions.

The controller 40 performs control to distinguish motion of the body portion 10 due to intentional stimulation from motion of the body portion 10 due to unintentional stimulation in real time. The controller 40 self-monitors deformation of the body portion 10 by self-sensing changes in the intervals between the first and second electrodes 31 and 32 according to deformation of the body portion 10. Here, the controller 40 controls motion of the body portion 10 by distinguishing and detecting motion of the body portion 10 due to intentional stimulation, such as application of air pressure, and motion of the body portion 10 due to unintentional stimulation, such as external force.

The controller 40 detects changes in intervals between the first and second electrodes 31 and 32 as the body 11 is bent in the opposite direction of the first limiter and self-monitors deformation motion of the body portion 10. Here, the controller measures a change in capacitance between the first and second electrodes 31 and 32 based on changes in intervals between the first and second electrodes 31 and 32, which are conductive fibers having a double helix structure.

The controller 40 self-detects a change in capacitance between the first and second electrodes 31 and 32 in real time, so that the controller 40 monitors deformation of the body portion 10 in real time. Accordingly, the first and second electrodes 31 and 32 electrically connected to the controller 40 limit radial deformation of the body portion 10. In addition, the first and second electrodes 31 and 32 serve as a kind of electrostatic deformation sensor in which capacitance is varied according to deformation of the body portion 10. That is, the first and second electrodes 31 and 32 may simultaneously perform a function of limiting motion of the body portion 10 and a function as an electrostatic sensor.

For reference, a control algorithm of the controller 40 and a method of self-monitoring of the soft actuator 1 are described in detail as follows.

As shown in FIG. 4, a method of self-monitoring of the soft actuator 1 according to an embodiment of the present invention is described as follows.

The method of self-monitoring of the soft actuator 1 includes step 41 of applying intentional stimulation, step 45 of applying unintentional stimulation, step 42 of generating motion, step 43 of performing self-sensing, and step 44 of controlling feedback.

First, in step 41 of applying intentional stimulation, intentional stimulation is applied to the body portion 10 by the controller 40. Here, to apply intentional stimulation, the controller 40 applies air pressure to the body portion 10 by supplying air (A) to the inside of the body 11 through the air pump 14 connected to the air channel 15. At this time, the controller 40 may apply an air pressure of approximately 0 N to N to the body portion 10, but the present invention is not limited thereto.

For reference, in addition to air pressure, the controller 40 may apply intentional stimulation by applying a voltage to the first and second limiters 20 and 30.

By performing step 41 of applying intentional stimulation, the body portion 10 is deformed to generate motion (step 42). In step 42 of generating motion, bending of the body portion 10 may occur within a range of up to 180°. In addition, it is preferable that the response speed of the body portion 10 by application of air pressure is 1 ms or less.

In addition, in step 42 of generating motion, the deformation direction is limited by the first and second limiters 20 and 30 inserted into the first and second insertion grooves 12 and 13 of the body 11. Specifically, bending is limited to one side of the body 11 on which the first limiter 20 is formed, and at the same time, deformation of the body 11 in the radial direction is limited by the second limiter 30. As a result, as shown in FIG. 6, in the body portion 10, bending motion is generated for the other side of the body 11 (step 42).

In step 43 of performing self-sensing, deformation of the body portion 10 occurred in step 42 of generating motion is self-sensed by the controller 40. In step 43 of performing self-sensing, as shown in FIGS. 5 and 6, intervals D1 and D2 between the first and second electrodes 31 and 32 having a double helix structure are detected.

Specifically, due to bending of the body portion 10, the first interval D1 between the first and second electrodes 31 and 32 shown in FIG. 5 increases to the second interval D2 shown in FIG. 6. At this time, the controller 40 detects the degree of change between the first and second intervals D1 and D2. At this time, the controller 40 may detect bending deformation of the body portion 10 within a minimum detection range of about 5°, and the bending angle range of the body portion 10 is 0 to 180°. In addition, the minimum strain of the body portion 10 detectable by the controller 40 may be 0.1%.

For reference, since the first and second electrodes 31 and 32 are formed of conductive fibers, a change in capacitance due to changes in the intervals D1 and D2 between the first and second electrodes 31 and 32 may be detected by the controller 40 electrically connected to the first and second electrodes 31 and 32, which are a kind of electrostatic sensor.

In step 44 of controlling feedback, based on detected information according to changes of the intervals D1 and D2 between the first and second electrodes 31 and 32, the controller 40 determines whether feedback control is performed (step 44). When it is determined that feedback control is necessary, the controller 40 returns to step 41 of applying intentional stimulation, and controls the supply amount of air (A) applied to the body portion 10.

In addition, unintentional stimulation (step 45) such as external force may be applied to the body portion 10 instead of intentional stimulation (step 41) such as air (A) applied by the controller 40. Even in step 45 of applying unintentional stimulation to the body portion 10, motion is generated due to deformation of the body portion 10 (step 42), and the controller 40 distinguishes between unintentional stimulation and intentional stimulation and performs self-sensing in real time (step 43). Step 43 of performing self-sensing by the controller 40 is connected to step 44 of controlling feedback to control air pressure applied to the body portion 10. That is, deformation of the body portion 10 in step 45 of applying unintentional stimulation is detected by the controller 40, and the subsequent step is controlled to be fed back to step 41 of applying intentional stimulation.

In addition, a configuration for classifying and controlling motion by intentional and unintentional stimulation applied to the soft actuator 1 in real time is described in detail as follows.

First, under the condition that no external force is applied, changes in the intervals D1 and D2 between the first and second electrodes 31 and 32 caused by applying intentional stimulation such as air pressure to the body portion 10 are self-sensed by the first and second electrodes 31 and 32. In this case, the first and second electrodes 31 and 32 are a kind of electrostatic sensor made of conductive fiber, and the response of the first and second electrodes 31 and 32 by intentional stimulation is quantified. Based on the quantified information of the first and second electrodes 31 and 32, a motion deformation result value according to application of intentional stimulation of the soft actuator 1 may be predicted.

In addition, intentional stimulation and unintentional stimulation applied to the body portion 10 may be distinguished by the following equations.

First, motion by intentional stimulation may be defined as (actual result value−expected result value≈0)(requires optimization for tolerance), and motion by unintentional stimulation may be defined as (actual result value−expected result value≠0).

Here, the actual result value is a value detected by the first and second electrodes 31 and 32 for deformation caused by intentional or unintentional stimulation applied in real time, and the expected result value is a value obtained by quantifying the response of the first and second electrodes 31 and 32 by intentional stimulation.

Based on the equation, when the controller 40 determines that motion deformation has occurred due to unintentional stimulation, the difference between a deformation degree (reference deformation degree) corresponding to a specific pressure value applied to the body portion 10 and a sensed deformation degree is calculated. Then, a desired amount of deformation may be obtained by increasing or decreasing pressure applied to the inside of the body portion 10 so that the Δ deformation degree (=reference deformation degree−sensed deformation degree) is zero. Here, when the Δdeformation degree has a positive value, air pressure applied to the inside of the body portion 10 is increased, and when the Δ deformation degree has a negative value, air pressure applied to the inside of the body portion 10 is decreased.

When the soft actuator 1 described in the present invention holds or places a specific object, motion deformation caused by intentional and unintentional stimulation may be distinguished and controlled in the following manner.

First, when pressure applied to the body portion 10 of the soft actuator 1 is 0, and deformation of x % or more lasts for y seconds, the controller 40 determines that a user, such as a hemiplegic patient, wants to hold a specific object, and increases air pressure applied to the body portion 10. Here, the x and y values reflect the user's conditions of use, such as the degree of hemiplegia and muscular endurance, and the x and y values may be changed.

For reference, a certain amount of contact force may be required to hold or lift a specific object using the soft actuator 1. Considering various factors such as frictional force of the surface of an object, weight, shape, etc., the contact force may have different pressure values depending on the type of object to be gripped. Accordingly, even when pressure applied to the soft actuator 1 increases, when deformation does not occur, an embodiment designed to continuously maintain the pressure at that time is also possible.

When a user places a specific object gripped by using the soft actuator 1, pressure may be released after a certain period of time (grip time). Here, the grip time may be set differently in consideration of the exercise ability and life radius of a user using the soft actuator 1.

As described above, in the soft actuator 1 according to the present invention, since the first and second limiters 20 and 30 are attached to the body portion 10, the bending direction of the body portion 10 may be adjusted. At this time, by adjusting the length and direction of the first and second limiters 20 and 30, deformation of the body portion 10 may be adjusted in various ways. At this time, by adjusting the mechanical properties of a material constituting the first limiter 20, the structural design factor of conductive fiber constituting the second limiter 30, and the design factor of the body portion 10, the motion performance and stability according to the internal pressure change of the soft actuator 1 may be optimized.

In addition, in the soft actuator 1 according to the present invention, in addition to intentional stimulation applied to the body portion 10, unintentional stimulation may also be self-sensed by the controller 40. In particular, by detecting the interval change between the first and second electrodes 31 and 32 of the second limiter 30 integrally attached to the outer surface of the body portion 10 by the controller 40, real-time self-monitoring may be performed using a simple structure that does not require an additional sensing means.

Although the present invention has been described above with reference to the embodiments of the present invention, those skilled in the art may variously modify and change the present invention without departing from the spirit and scope of the present invention as set forth in the claims below.

INDUSTRIAL APPLICABILITY included in the text.

The invention claimed is:
1. An integral self-monitoring soft actuator, comprising:
a body portion configured to be driven by deformation due to stimulation;
a first limiter integrally formed with respect to a longitudinal direction of the body portion to limit deformation of the body portion in the longitudinal direction;
a second limiter that limits deformation of the body portion in a radial direction by comprising at least a pair of electrodes in a spiral shape integrally provided on an outer surface of the body portion; and
a controller for controlling motion of the body portion,
wherein the second limiter comprises a first electrode provided in a spiral direction along an outer surface of the body portion, and
a second electrode provided in a spiral direction along the outer surface of the body portion,
wherein the first and second electrodes are alternately disposed adjacent to each other and are made of conductive fiber,
wherein the controller detects a change in capacitance in real time according to changes in intervals between the first and second electrodes, and performs feedback control by distinguishing motion by intentional stimulation or unintentional stimulation applied to the body portion, and wherein the controller self-monitors deformation of the body portion by self-sensing changes in intervals between the electrodes according to deformation of the body portion.

2. The integral self-monitoring soft actuator according to claim 1, wherein the body portion is made of an elastic material,
the first limiter is made of a fiber material that physically limits deformation of the body portion, and
the second limiter is made of a conductive fiber material.

3. The integral self-monitoring soft actuator according to claim 1, wherein the body portion comprises a hollow body made of an elastic material, and
first and second insertion grooves into which the first and second limiters are inserted and seated are formed on an outer surface of the body.

4. The integral self-monitoring soft actuator according to claim 1, wherein the first limiter is provided in a form of one degree of freedom in a longitudinal direction on one side of the body portion, and
when external stimulation is applied to the body portion, deformation occurs on the other side where the first limiter is not provided.

5. The integral self-monitoring soft actuator according to claim 1, wherein the first and second limiters are attached to an outer surface of the body portion.

6. The integral self-monitoring soft actuator according to claim 1, wherein the first and second electrodes are inserted into insertion grooves provided on an outer surface of the body portion and are protected by being coated with an elastic material.

7. The integral self-monitoring soft actuator according to claim 1, wherein the controller quantifies the capacitance change according to changes in intervals between the first and second electrodes by the intentional stimulation as an expected result value, and distinguishes the intentional stimulation and the unintentional stimulation by comparing a value obtained by subtracting the expected result value from an actual result value corresponding to real-time interval changes between the first and second electrodes with 0.

8. The integral self-monitoring soft actuator according to claim 1, wherein, when pressure applied to the body portion is 0, when deformation of x % or more lasts for y seconds, the controller increases the intentional stimulation applied to the body portion.

9. The integral self-monitoring soft actuator according to claim 1, wherein intervals between the first and second electrodes wound along an outer surface of the body portion and a spiral angle of the first and second electrodes are adjustable.

10. A method of self-monitoring of a soft actuator, comprising:
a stimulation step of applying stimulation to a body portion;
a motion generation step in which the body portion is deformed by the stimulation;
a self-sensing step of self-sensing deformation of the body portion; and
a feedback control step of performing feedback control on the body portion,
wherein the electrodes are made of conductive fiber and are attached to an outer surface of the body portion, and
in the self-sensing step, a change in capacitance according to changes in intervals between the electrodes is detected in real time,
wherein, in the feedback control step, the capacitance change according to changes in intervals between the electrodes by intentional stimulation applied to the body portion is quantified as an expected result value, and the intentional stimulation and the unintentional stimulation are distinguished by comparing a value obtained by subtracting the expected result value from an actual result value corresponding to real-time interval changes between the electrodes with 0, and
wherein, in the self-sensing step, changes in intervals between at least a pair of electrodes provided in a double helix structure on the body portion are detected.

11. The method according to claim 10, wherein, in the stimulation step, at least one stimulation of intentional stimulation by driving sources comprising air pressure, a voltage, pressure of a liquid flowing into the body portion or vaporization pressure of the liquid, expansion due to increase in temperature inside the body portion, stimulation response by light, and chemical reaction and unintentional stimulation by external force is applied to the body portion.

12. The method according to claim 10, wherein, in the feedback control step, intentional and unintentional stimulation applied to the body portion are separately detected, and
when motion generation of the body portion due to the unintentional stimulation is detected, control is performed to apply the intentional stimulation to the body portion.

13. The method according to claim 10, wherein the body portion is made of an elastic material,
deformation of the body portion in a longitudinal direction is limited by a first limiter provided in a form of one degree of freedom in a longitudinal direction on the body portion, and
deformation of the body portion in a radial direction is limited by the electrodes.

14. The method according to claim 13, wherein the first limiter is made of a fiber material that physically limits deformation of the body portion and is attached to an outer surface of the body portion.

15. The method according to claim 10, wherein, in the feedback control step, when pressure applied to the body portion is 0, when deformation of x % or more lasts for y seconds, intentional stimulation applied to the body portion is increased.

16. The method according to claim 10, wherein intervals between the electrodes wound along an outer surface of the body portion and an spiral angle of the electrodes are adjustable, and
the electrodes are inserted into insertion grooves provided on an outer surface of the body portion and are protected by being coated with an elastic material.

* * * * *